United States Patent
Eliáš et al.

(10) Patent No.: US 9,516,143 B2
(45) Date of Patent: Dec. 6, 2016

(54) SYSTEM AND METHOD FOR ASSEMBLY AND USE OF INTEGRATION APPLICATIONS

(71) Applicant: Red Hat, Inc., Raleigh, NC (US)

(72) Inventors: Filip Eliáš, Vysni Lhoty (CZ); Filip Nguyen, Brno (CZ)

(73) Assignee: RED HAT, INC., Raleigh, NC (US)

( * ) Notice: Subject to any disclaimer, the term of this patent is extended or adjusted under 35 U.S.C. 154(b) by 168 days.

(21) Appl. No.: 13/962,690

(22) Filed: Aug. 8, 2013

(65) Prior Publication Data

US 2015/0046513 A1    Feb. 12, 2015

(51) Int. Cl.
| | | |
|---|---|---|
| G06F 15/16 | (2006.01) | |
| H04L 29/06 | (2006.01) | |
| H04L 29/08 | (2006.01) | |

(52) U.S. Cl.
CPC ............ *H04L 69/22* (2013.01); *H04L 67/16* (2013.01)

(58) Field of Classification Search
CPC ...................................................... H04L 67/10
See application file for complete search history.

(56) References Cited

U.S. PATENT DOCUMENTS

| | | | | |
|---|---|---|---|---|
| 5,870,473 | A * | 2/1999 | Boesch et al. .................. | 705/78 |
| 8,019,632 | B2 | 9/2011 | Niheu et al. | |
| 8,375,010 | B2 | 2/2013 | Banister et al. | |
| 2004/0153561 | A1* | 8/2004 | Dalal et al. ..................... | 709/231 |
| 2004/0230636 | A1* | 11/2004 | Masuoka ............... | G06F 9/4443 708/800 |
| 2006/0218429 | A1* | 9/2006 | Sherwin et al. .............. | 713/600 |
| 2007/0011281 | A1* | 1/2007 | Jhoney .................. | G06Q 40/04 709/220 |
| 2007/0118545 | A1* | 5/2007 | Chandrasekharan et al. ............................ | 707/101 |
| 2007/0256069 | A1* | 11/2007 | Blackman et al. ........... | 717/170 |
| 2009/0182838 | A1* | 7/2009 | Ivanova et al. ............... | 709/217 |
| 2009/0198642 | A1* | 8/2009 | Akkiraju .................. | G06N 5/02 706/54 |
| 2009/0293059 | A1* | 11/2009 | Nathan ..................... | G06F 8/34 718/100 |

(Continued)

FOREIGN PATENT DOCUMENTS

CN         201663613 U       12/2010

OTHER PUBLICATIONS

Pearson, Chip, "Writing Your Own Functions in VBA", www.cpearson.com, Nov. 24, 2011 (Page Last Updated Sep. 1, 2007).*
Bitpipe Research Guide, "EAI and Web Services Overview," Bitpipe.com online library website, 2 pages, retrieved Oct. 25, 2013, http://www.bitpipe.com/eai/eai_overview.jsp.
Gravic Shadowbase Solutions, "Part 4—Enterprise Application Integration (EAI)," Gravic.com online website article, 3 pages, retrieved Oct. 25, 2013, http://www.gravic.com/shadowbase/uses/enterpriseapplicationintegration.html.

(Continued)

*Primary Examiner* — Vivek Srivastava
*Assistant Examiner* — Nicholas Celani
(74) *Attorney, Agent, or Firm* — Haynes & Boone LLP

(57) ABSTRACT

A system and method of assembly and use of integration applications includes receiving a first request for services from a first client, the first request for services includes a first custom services header including one or more service descriptors, parsing the first custom services header to extract each of the service descriptors, determining a service corresponding to each of the service descriptors, inserting a request for the service into an integration application, deploying the integration application to an application server, adding a first entry to an application list, the first entry corresponding to the integration application, forwarding the first request for services to the integration application, receiving a response from the integration application, and returning the response to the first client. In some examples, the system and method further includes periodically purging one or more other integration applications from the application server based on timestamps recorded in the application list.

18 Claims, 4 Drawing Sheets

(56) References Cited

U.S. PATENT DOCUMENTS

| | | | |
|---|---|---|---|
| 2010/0010974 A1* | 1/2010 | Chieu | G06F 9/5038 707/E17.005 |
| 2010/0103927 A1* | 4/2010 | Bakker | 370/352 |
| 2010/0332592 A1* | 12/2010 | Hamada | 709/203 |
| 2011/0202377 A1 | 8/2011 | Maiya et al. | |
| 2012/0042067 A1* | 2/2012 | Gerstenfeld et al. | 709/224 |
| 2012/0173557 A1* | 7/2012 | Russell | G06F 8/71 707/756 |
| 2013/0125137 A1* | 5/2013 | Diekema et al. | 719/313 |

OTHER PUBLICATIONS

IBM webservices, "Choosing among JCA, JMS, and web services for EAI," IBM.com Developer Works technical library document, Mar. 1, 2003, 11 pages, PDF retrieved Oct. 25, 2013 from http://www.ibm.com/developerworks/webservices/library/ws-jcajms/index.html.

D'Cruz, Conrad F., "Synchronous Implementation using Web Services," Enterprise Integration Patterns website, retrieved Oct. 25, 2013, 12 pages, http://www.eaipatterns.com/ComposedMessagingWS.html.

* cited by examiner

SYSTEM AND METHOD FOR ASSEMBLY AND USE OF INTEGRATION APPLICATIONS

BACKGROUND

The present disclosure relates generally to computing systems, and more particularly to assembly and use of integration applications.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computers, processors, and software systems often share information and provide computing services for each other. In order to do so, a server or some other computing system may provide an interface through which service requests are made by the other computing devices or clients. In these service-oriented architectures (SOAs), the clients generally make a request for services by sending a request message to the server hosting the service using, for example, a networking protocol. The server receives the message, activates the requested service, and returns a response message with the result. For example, a very basic form of services is demonstrated by a request for a web page. A client, such as a web browser, sends a Hypertext Transport Protocol (HTTP) request to a web server which receives the HTTP request and generates a response containing the requested web page that is returned to the web browser. Most computing systems and clients have access to many servers providing a large array of services that the clients are free to use. This approach, however, does not easily address the situations where a client desires a service, which is then different from an existing service. An administrator or a developer associated with the client may generate a custom service or integration application, but this may be costly and time-consuming, and does not address the next request for a custom service or integration application.

Accordingly, it would be desirable to provide improved systems and methods for customizing services and assembling integration applications.

SUMMARY

According to one example, a method of processing a request for services includes receiving a first request for services from a first client, the first request for services includes a first custom services header including one or more service descriptors, parsing the first custom services header to extract each of the service descriptors, determining a service corresponding to each of the service descriptors, inserting a request for the service into an integration application, deploying the integration application to an application server, adding a first entry to an application list, the first entry corresponding to the integration application, forwarding the first request for services to the integration application, receiving a response from the integration application, and returning the response to the first client.

According to another example, an integration system includes a gateway configured to receive a first request for services from a first client, an application list, an integration assembler, and a router. The first request for services includes a first custom services header including one or more service descriptors. The integration assembler receives the first custom services header from the gateway, parses the first custom services header to extract each of the service descriptors, determines a service corresponding to each of the service descriptors, inserts a request for the service into an integration application, deploys the integration application to an application server, adds a first entry to the application list, the first entry corresponding to the integration application, forwards the first request for services to the integration application using the router, receives a response from the integration application, and returns the response to the first client.

According to yet another example, a non-transitory machine-readable medium comprising a first plurality of machine-readable instructions which when executed by one or more processors associated with an integration server are adapted to cause the one or more processors to perform a method including receiving a first request from a first client, the first request comprising a first field including a first description of a first service, parsing the first field to extract the first description, searching a catalog of services for a service corresponding to the first description, adding a request for the service to a first custom service, sending the first custom service to a host server, adding a first record to a custom services registry, the first record being associated with the first field and corresponding to the first custom service, sending the first request to the first custom service, receiving a first response from the first custom service, returning the first response to the first client, receiving a second request from a second client, the second request comprising a second field including a second description of a second service, determining whether the custom services registry includes a second record associated with the second field, forwarding the second request to a second custom application corresponding to the second record when the second record is associated with the second field, sending the second request to the second custom service, receiving a second response from the second custom service, and returning the second response to the second client.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
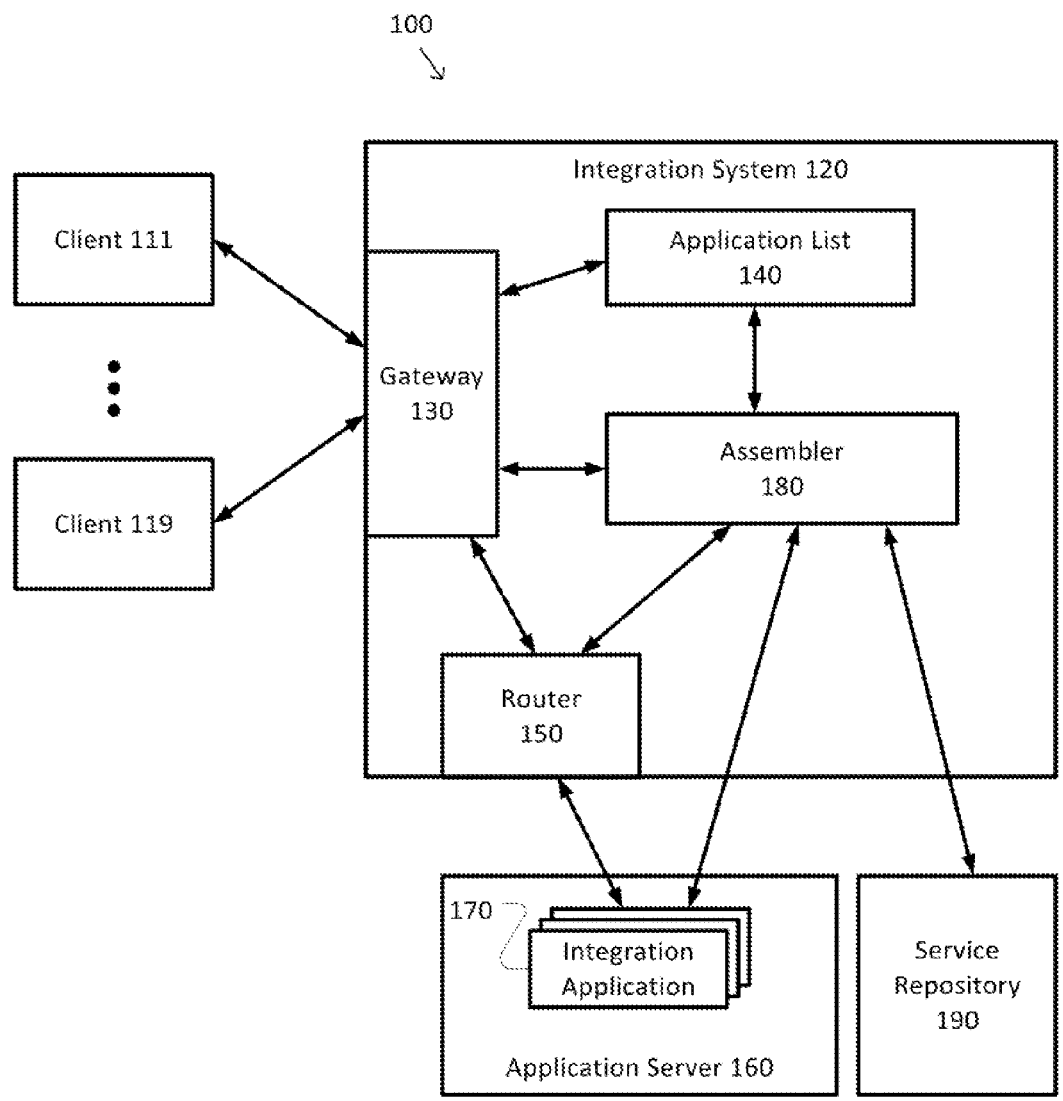
FIG. 1 is a simplified diagram of a service-oriented architecture according to some examples.

FIG. 1 is a simplified diagram of a service-oriented architecture (SOA) 100 according to some examples. As shown in FIG. 1, SOA 100 is built around a client-services model. In SOA 100, requests for services originate from one or more clients 111-119. Rather than make all their requests for services directly, clients 111-119 may make some of their requests for services through an integration system 120. Integration system 120 not only provides support for requests for existing services, but can also create and support customized services called integration applications or enterprise integration applications. These integration applications may support the combination of one or more existing services that may provide customized and customizable services that would not otherwise be available without manual customization by an administrator or developer. This may reduce the cost and time of delivery for the integration applications as they can be created and used as a result of a request received from one of the clients 111-119.

Clients 111-119 may make their requests for services to integration system 120 through a gateway 130. Gateway 130 provides an interface for receiving the requests for services. For example, integration system 120 may implement gateway 130 using an application programming interface (API), a collection of remote procedure calls, a collection of web services, and/or the like. In general, gateway 130 may receive requests for services by receiving messages using any suitable protocol. In some examples, the protocol may include HTTP, HTTP Secure (HTTPS), Simple Object Access Protocol (SOAP), Java Messaging System (JMS), and/or the like.

Once a request for a service is received at gateway 130, the request is analyzed to determine which type of service is being requested. In some examples, when the requested service is a basic service request for an existing service, integration system 120 may act as a proxy for the request and forward it to the designated service. In this situation, when integration system 120 receives a response from the provider of the requested service, integration system may return it to the requesting client. Integration system 120 further includes the ability to receive requests for custom services, assemble the custom services as integration applications, and then invoke the integration applications on behalf of the requesting clients.

According to some examples, one of the clients 111-119 may indicate that its request is a request for a custom service by including a custom services field and/or custom services header into the request for services. In some examples, the custom services header may include a script or script-like description of the requested integration application as is discussed in further detail in FIG. 3. When the custom services header is detected, integration system 120 may look to see if the requested custom service has been previously assembled. Integration system 120 may do this by consulting an application list or registry 140 that integration system 120 maintains of previously assembled integration applications. Application list 140 may be implemented using any data structure or database that can store a list of unique entries or records and provide a lookup mechanism. For example, application list 140 may be implemented using key-value pairs where the key is determined by applying a hashing function to the custom services header and the value includes information associated with the corresponding integration application. In some examples, the information associated with the corresponding integration application may include an end point reference for locating the integration application. In some examples, the end point reference may include a uniform resource locator (URL) of a server where the integration application is located, a name for the integration application, descriptions of input and output data, and/or the like. In some examples, the information associated with the corresponding integration application may further include a timestamp recording the last time the corresponding integration application was used by a client.

When integration system 120 successfully detects the requested integration application in application list 140, this means that the requested integration application has been previously assembled and may be used without having to assemble it. When the integration application already exists, the request for services is forwarded to a router 150. Router 150 uses the end point reference, the URL, and/or other location information found in application list 140 to forward the request for services to the correct integration application. The integration application may be hosted on an application or host server 160 along with one or more other integration applications 170. The request is then processed by the integration application and a response is returned to integration system 120, which returns the response to the client that made the request for the integration application. In some examples, the timestamp included in the corresponding entry of application list 140 may be updated to reflect this use of the integration application.

When integration system 120 does not detect the requested integration application in application list 140, the request for services is sent to an integration assembler 180. Integration assembler 180 examines and/or parses the contents of the custom services header and begins the process of assembling the requested integration application. Using the script-like descriptions included in the custom services header, the integration assembler 180 identifies one or more services that are to be combined and/or concatenated together to form the requested integration application. In some examples, the one or more services may be identified by name, by input/output pattern, by contract, and/or other methods as is discussed in further detail in FIG. 3. For each of the one or more services, integration assembler 180 queries a service repository 190 that maintains a catalog of known and/or registered services. Integration assembler 180 then builds a custom integration application which includes a request for each of the one or more services found in the custom services header and found in service repository 190.

The custom integration application is then deployed by sending it to application server 160 where it is added to the integration applications 170. Additionally, a corresponding entry is added to application list 140 so that the custom integration application may be reused to respond to another request. In some examples, the added entry may include an end point reference, a URL, and/or other information for locating the custom integration application. In some examples, the added entry may also include a timestamp, which is updated to reflect this use of the custom integration application. The request for services is then forwarded to router 150 so that the custom integration application may handle the request for services and the response may be returned to the client that made the request.

In some examples, when integration assembler 180 is not able to find a corresponding service in service repository 190, integration system 120 may return an error response to the client that made the request indicating that the particular service could not be found and/or was unknown. In some examples, when integration assembler 180 is not able to find a uniquely corresponding service in service repository, such as when two services have the same input/output pattern, integration system 120 may return an error response to the client indicating that the request could not be uniquely resolved. In some examples, the error response may further include a list of matching services so that the client may use the error response to refine the custom services header and make another request for services.

Although not shown in FIG. 1, integration system 120 may further include a subsystem for purging one or more of the integration applications 170. In some examples, the purging subsystem may periodically review the timestamps in each of the entries of application list 140 to identify the least recently used of the integration applications 170. In some examples, the purging subsystem may purge and/or delete any integration application whose corresponding timestamp is older than a certain, but customizable value before the present. In some examples, the purging subsystem may purge only the least recently used integration applications until a desired amount of memory and/or storage is available on application server 160. In some examples, the purging subsystem may be operated at a fixed, but customizable interval, and/or triggered on demand when integration assembler 180 assembles a new integration application for deployment.

The use of integration system 120 in SOA 100 may provide several advantages over other client-services approaches that support only the use of existing services. Integration system 120, through the custom services header and integration assembler 180, allows a client to specify and create custom integration applications on demand using existing services. Additionally, by maintaining application list 140, integration system 120 provides the additional advantages of reuse of previously assembled integration applications.

Figure 2:
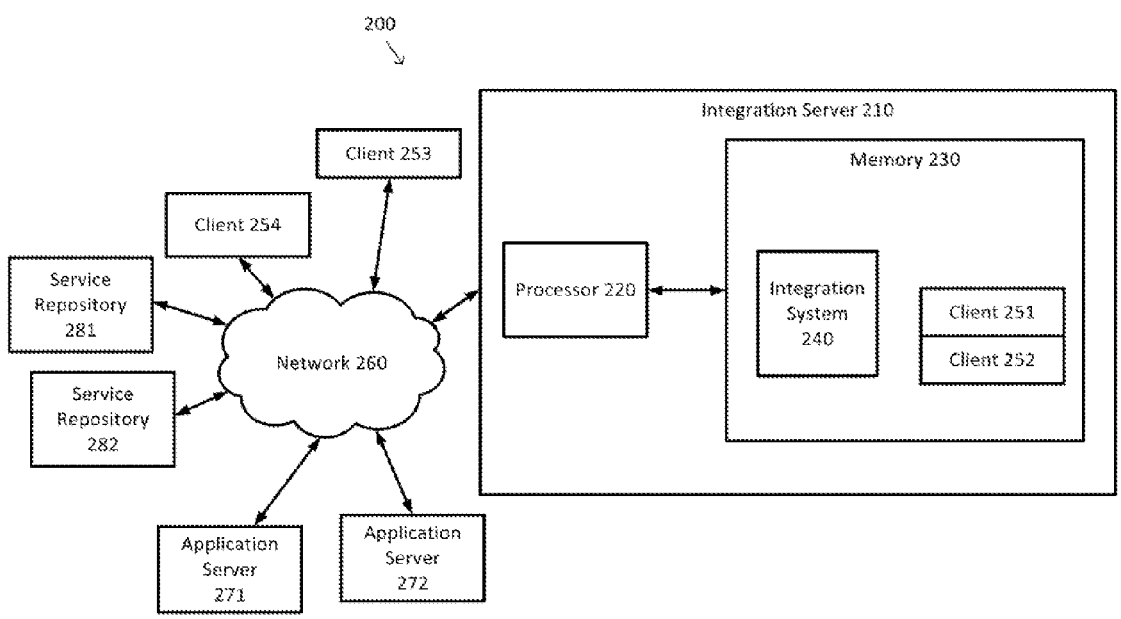
FIG. 2 is a simplified diagram of a computing system according to some examples.

FIG. 2 is a simplified diagram of a computing system 200 according to some examples. As shown in FIG. 2, computing system 200 illustrates a representative example of how an integration system, such as integration system 120 may be implemented in a networking environment. Computing system 200 includes an integration server 210. In some examples, integration server 210 may be a standalone workstation, a cluster, a production server, within a virtual machine, and/or the like. Integration server 210 includes a processor 220 coupled to memory 230. In some examples, processor 220 may control operation and/or execution of hardware and/or software on integration server 210. Although only one processor 220 is shown, integration server 210 may include multiple processors. Memory 230 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 230 may be used to store an integration system 240. In some examples, integration system 240 may be consistent with integration system 120. Integration system 240 includes one or more interfaces for receiving requests for services from one or more clients. Memory 230 may also be used to store one or more clients, including representative clients 251 and 252. Each of clients 251 and 252 may be similar to clients 111-119 and make requests for services to integration system 240. Although not explicitly shown in FIG. 2, integration system 240 and clients 251 and 252 may be hosted in one or more virtual machines and/or Java virtual machines running on integration server 210.

Integration server 210 and integration system 240 may also receive and support services requests from clients located outside integration server 210. As shown in FIG. 2, integration server 210 may be coupled to a network 260. Network 260 may be any kind of network including a local area network (LAN), such as an Ethernet, and/or a wide area network (WAN), such as the Internet. Several representative clients outside of integration server 210 are shown in FIG. 2 including clients 253 and 254. Each of clients 253 and 254 may be similar to clients 111-119 and use integration system 240 to process requests for service.

Further coupled to integration server 210 using network 260 are one or more application servers 271 and 272 as well as one or more service repositories 281 and 282. In some examples, application servers 271 and 272 may be similar to application server 160 and act as a host for one or more integration applications. In some examples, service repositories 281 and 282 may be similar to service repository 190 and provide a catalog of one or more services that may be used by integration system 240 to assemble integration applications. FIG. 2 demonstrates the flexibility of integration system 240 as it may be used with any number of clients, application servers, and/or service repositories.

Although not explicitly shown in FIG. 2, clients 251-254, application servers 271 and 272, and/or service repositories 281 and 282 may each be hosted in their own workstation, server, and/or computing device and/or hosted in any number and combination of workstations, servers, and/or computing devices, each with one or more processors and memory. For example, any of the clients 251-254, application servers 271 and 272, and/or service repositories 281 and 282 may be hosted on integration server 210. In other examples, each of clients 251-254, application servers 271 and 272, and/or service repositories 281 and 282 may further be hosted in one or more virtual machines and/or Java virtual machines running on the workstations, servers, and/or computing devices.

Figure 3:
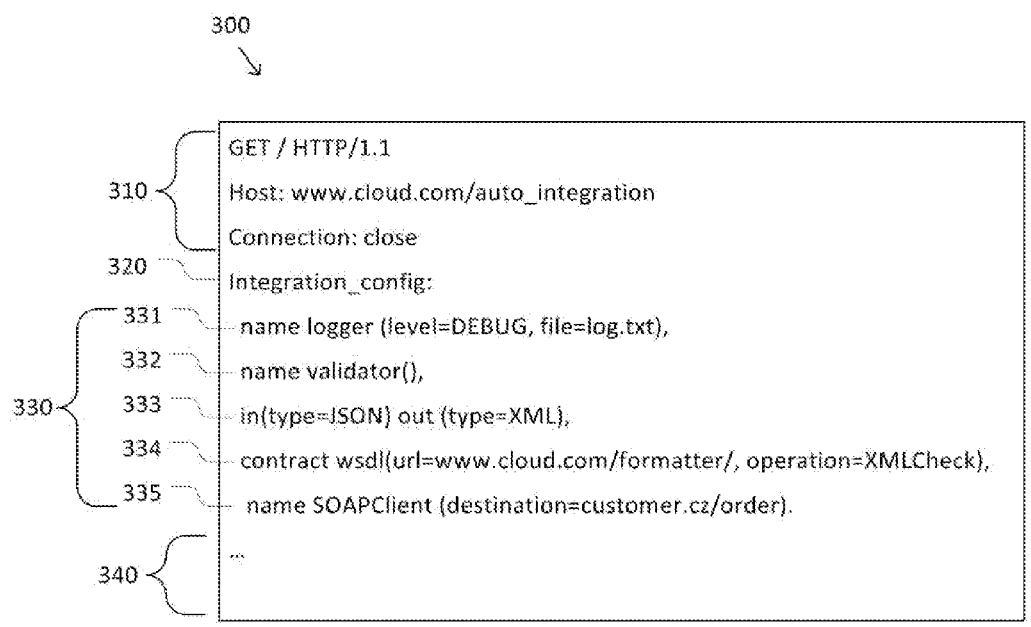
FIG. 3 is a simplified diagram of a request for services according to some examples.

FIG. 3 is a simplified diagram of a request for services 300 according to some examples. As shown in FIG. 3, request for services 300 uses HTTP as indicated in an HTTP header 310 showing a HTTP 1.1 GET request to the host www.cloud.com/auto_integration. In the context of FIG. 2, the host www.cloud.com/auto_integration may by a URL that identifies integration system 240 on integration server 210. As such, the delivery mechanisms of TCP/IP and the networking protocol stack of integration server 210 would route request for service 300 to integration system 240. In some examples, request for services 300 may be generated by any of the clients 111-119 and/or 251-254. The use of HTTP for request for services 300 is representative only as other protocols such as HTTPS, SOAP, JMS, and/or the like may similarly be used.

Request for services 300 may be distinguished from other basic requests for services by the inclusion of a custom services header. The custom services header is indicated in request for services 300 by a special keyword 320 containing the keyword "Integration_config". This choice of keyword for keyword 320 is representative only as any suitable keyword may be used to indicate the presence of the custom services header. The custom services header further includes a header body 330 including several service descriptors 331-335 that are to be combined to form a custom integration application for servicing request for services 300. Each of the service descriptors 331-335 demonstrate some of the many possible ways of describing a service that is to be combined by an integration assembler, such as integration assembler 180, to form the custom integration application.

Service descriptor 331 demonstrates the specification of a service by name. Using service descriptor 331, the integration assembler searches one or more service repositories like service repositories 190, 281, and/or 282 for a service with a name of "logger". Service descriptor 331 may be used to indicate that log messages at the DEBUG level be sent to a file named "log.txt" during execution of the custom integration application. In some examples, the search of the service repositories may also include the parameters and/or remaining signature as part of the search in a fashion analogous to a compiler looking for a match to a function call. In the case of service descriptor 331, this includes a service named logger with both a "level" and a "file" parameter and any remaining parameters that have default values. When the service repositories include a unique match, the integration assembler identifies the corresponding service and includes a request for that service in the custom integration application. In some examples, when the service repositories do not include a match, the integration assembler may respond to the request for services 300 with an error response indicating the inability to assemble the requested custom integration application. In some examples, when the service repositories include multiple matches, the integration assembler may respond with an error message indicating the inability to uniquely resolve the service and may also provide a list of the matching services so that client may refine the custom services header for use in a follow-up request for services.

Service descriptor 332 demonstrates another specification of a service by name, more specifically a service named "validator" without any parameters. Like service descriptor 331, the integration assembler attempts to uniquely identify a service in the service repositories and add a request for that service to the custom integration application being assembled.

Service descriptor 333 demonstrates the specification of a service by input/output parameters. Service descriptors like service descriptor 333 may be used to specify a service, not by name, but rather by the input and output parameters types it takes. Using service descriptor 333, the integration assembler will search the service repositories for a service that takes input data of the type JavaScript Object Notation (JSON) and generates output of the type eXtensible Markup Language (XML). In some examples, use of service descriptors specified by input/output parameters may be useful for specifying type and/or format converters. Like service descriptors 331 and 332, the integration assembler attempts to uniquely identify a service in the service repositories and add or insert a request for that service to the custom integration application being assembled.

Service descriptor 334 demonstrates the specification of a service by a contract. Service descriptor 334 specifies the operation XMLCheck included within a service defined using the web service descriptor language (WSDL) at the URL www.cloud.com/formatter/. Like service descriptors 331-333, the integration assembler attempts to uniquely identify a service in the service repositories and add a request for that service to the custom integration application being assembled. In some examples, the integration installer may further query the server at www.cloud.com/formatter for a WSDL file that defines the requested web service.

Service descriptor 335 demonstrates another specification of a service by name and is processed similarly to service descriptors 331 and 332.

According to certain examples, request for services 300 may further include any number of additional headers and/or fields 340. In some examples, the additional headers and/or fields 340 may include one or more headers used to specify behavior of the services described in header body 330. In some examples, the additional headers and/or fields 340 may include a body of the request for services that includes source data and/or parameters to be passed to the custom integration application after it is deployed.

Once the custom integration application is assembled, the custom integration application is deployed to an application server such as application server 160, 271, and/or 272. Additionally, an entry may be added to an application list such as application list 140. The entry in the application list may identify the custom integration application using a hash of custom services header body 330. In some examples, the custom services header body 330 may be processed to remove excess white space characters and other immaterial differences in the content of custom services header body 330 prior to hashing, so that two custom services header bodies that only differ in immaterial formatting may generate the same hash value. Once deployed, the custom integration application may be executed based on the remaining information in the request for services 300.

According to some examples, the flow of data from service to service in the custom integration application may generally follow a piped data model. In the examples of request for services 300, after logging is enabled, a data payload in fields 340 is processed by the validator service. The validated data payload is then converted from JSON to XML, checked by the web service XMLCheck, and then directed to a SOAP service at customer.cz.order. The result of the processing may then be returned as a response to the client that made the request for services 300.

Figure 4:
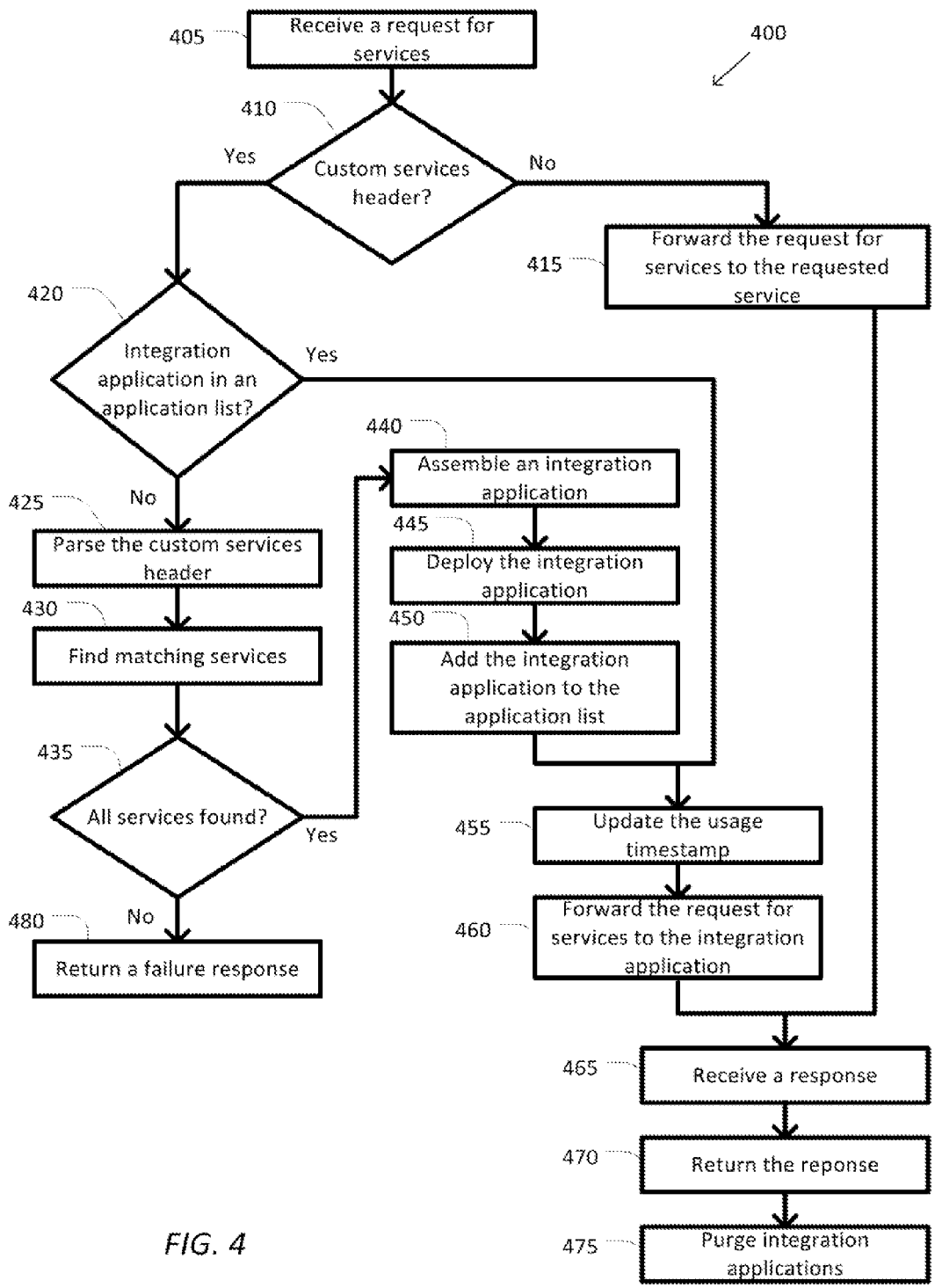
FIG. 4 is a simplified diagram of a method of assembly and use of integration applications according to some examples.

FIG. 4 is a simplified diagram of a method 400 of assembly and use of integration applications according to some examples. In some examples, one or more of the processes 405-480 of method 400 may be implemented, at least in part, in the form of executable code stored on non-transient, tangible, machine readable media that when run by one or more processors (e.g., the processor 220 of integration server 210) may cause the one or more processors to perform one or more of the processes 405-480. In some examples, method 400 may be used by integration system 120 and/or 240 to receive requests for services, to assemble integration applications as necessary, and to forward the requests for services to the integration applications. Method 400 is merely representative, and in some examples, one or more of the processes 410, 415, 455, 475, and/or 480 may be optional.

At a process 405, a request for services is received. In some examples, the request for services may be received by a gateway of an integration system like integration system 120 and/or 240. In some examples, the request for services may be received from a client of the integration system, such as any of the clients 111-119 and/or 251-254. The request for services may include a basic request for services or a request for an integration application. In some examples, the request for services may be formatted similarly to the request for services 300.

At an optional process 410, it is determined whether the request for services includes a custom services header. Presence of the custom services header indicates that the request for services received during process 405 includes a request for an integration application. In some examples, the custom services header may be detected by examining the request for services for a special keyword, such as the keyword "Integration_config" as used in the request for services 300. When the custom services header is not detected, the request for services may be processed like a basic request for services using a process 415. When the custom services header is detected, the request for services is further processed beginning at a process 420.

At the optional process 415, the request for services is forwarded to the requested service. When the request for services received during process 405 does not include the custom services header, it may be processed as a basic request for services. This may be done by forwarding or sending the request for services to the service specified in the request for services. In some examples, the request for services may be forwarded using a router, such as router 150. After the request for services is forwarded, the integration system waits for a response from the specified service using a process 465. In some examples, processes 410 and 415 permit the integration system to handle both basic requests for services and requests for integration applications. In some examples, when the integration system supports only integration applications, the processes 410 and 415 may be omitted.

At the process 420, it is determined whether the integration application specified in the custom services header is found in an application list. To provide for improved handling of integration applications, the integration system uses the application list to keep track of assembled integration applications. This permits effective reuse of previously assembled integration applications. In some examples, the application list may be the application list 140. Presence of an integration application with a matching custom services header may be detected by comparing a hash of the custom services header with hashes of the custom services headers of previously assembled integration applications that are included in the application list. In some examples, the custom services header may be processed to remove excess white space characters and other immaterial differences in the content of custom services header prior to hashing, so that two custom services header bodies that only differ in immaterial formatting may generate the same hash value. When an entry in the application list includes a custom services header matching the custom services header of the request for services, the corresponding and previously assembled integration application is used beginning with a process 455. When no matching entry is found in the application list, a new integration application is assembled beginning with a process 425.

At the process 425, the custom services header is parsed. The custom services header is parsed by an integration assembler, such as integration assembler 180, to identify each of the service descriptors found in the custom services header. The service descriptors may be based on named services, input/output patterns, services contracts, and/or the like.

At a process 430, matching services are found. Each of the service descriptors identified during process 435 is searched for by the integration assembler. In some examples, the integration assembler may search one or more service repositories like service repositories 190, 281, and/or 282 looking for a search matching each of the service descriptors. In some examples, a search for a service matching a service descriptor including a contract may also include a search for a description file, like a WSDL file, at a designated URL.

At a process 435, it is determined whether all the services are found. When a uniquely matching service to each of the service descriptors in the custom services header cannot be found during process 430, the integration assembler is not able to assemble an integration application to handle the request for services received during process 405. When all the specified services cannot be uniquely found a failure response is returned using a process 480. When all of the specified services can be uniquely found, the integration application is assembled using a process 440.

At the process 440, an integration application is assembled. Using each of the service descriptors identified during process 425 and the corresponding services found during process 430, the integration assembler assembles the integration application. The integration application includes a request for each of the services found during process 425.

At a process 445, the integration application is deployed. Once the integration application is assembled during process 440, the integration application is deployed to an application server from which it can be executed. In some examples, the application server may be the application server 160, 271, and/or 272.

At a process 450, the integration application is added to the application list. To support reuse of the integration application, the integration application is added to the application list maintained by the integration system. In some examples, the custom services header is hashed to create a key that identifies the integration application assembled deployed during process 445. In some examples, the custom services header may be processed to remove excess white space characters and other immaterial differences in the content of custom services header prior to hashing. The key may be used as part of a key-value pair entry in the application list. The value of the key-value pair may include at least an end point reference and/or a URL identifying the application server and a location on the application server where the integration application was deployed during process 445.

At the optional process 455, a usage timestamp is updated. To keep track of which integration applications are being reused and which are not, the integration system may record a timestamp for each integration application in the corresponding application list entry for that integration application. In some examples, every time an integration application is used, the corresponding timestamp is updated to reflect a time of last use.

At a process 460, the request for services is forwarded to the integration application. The request for services received during process 405 is forwarded either to the previously assembled integration application identified during process 420 or the newly assembled integration application deployed during process 445 so that the request for services may be handled by the corresponding integration application. In some examples, the request for services may be forwarded using a router, such as router 150.

At the process 465, a response is received. The response is received from either the service to which the request for services was forwarded to during process 415 or the integration application to which the request for services was forwarded to during process 460.

At a process 470, the response is returned. The response received during process 465 is returned to the client that made the corresponding request for services received during process 405. In some examples, the response may be returned to the client using the gateway.

At an optional process 475, integration applications are purged. In some examples, a purging subsystem may periodically review the timestamps in each of the entries of the application list to identify the least recently used of the integration applications in the application list. In some examples, the purging subsystem may purge and/or delete any integration application whose corresponding timestamp is older than a certain, but customizable value before the present. In some examples, the purging subsystem may purge only the least recently used integration applications until a desired amount of memory and/or storage is available on the application server where the integration applications are deployed. In some examples, the purging subsystem may be operated at a fixed, but customizable interval, and/or triggered on demand when the integration assembler deploys a new integration application.

At the optional process 480, a failure response is returned. The failure response may be returned whenever the integration assembler is not able to uniquely find one or more of the services specified in the service descriptors of the custom services header during process 430. In some examples, when the service repositories do not include a match for a service descriptor, the integration assembler may respond to the request for services with the error response indicating the inability to assemble the requested integration application. In some examples, when the service repositories include multiple services matching a service descriptor, the integration assembler may respond with the error response indicating the inability to uniquely resolve the service and may also provide a list of the matching services so that client may refine the request for services.

Some examples of integration system 120 and/or 240 may include non-transient, tangible, machine readable media that include executable code that when run by one or more processors (e.g., processor 220) may cause the one or more processors to perform the processes of method 400 as described above. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of processing a request for services, the method comprising:
  receiving a first request for services from a first client;
  parsing the first request for services to determine whether the first request for services includes a first custom services header including a plurality of service descriptors;
  parsing the first custom services header to identify each of the service descriptors;
  creating an integration application in response to receiving the first request for services;
  determining a type of each of the service descriptors, each type being a name descriptor, an in-out parameter descriptor, or a contract descriptor;
  when the type of a first one of the service descriptors is a name descriptor:
    parsing the first service descriptor to determine a name of a service and a signature of the service;
    searching one or more service repositories to identify a first service having a same name and signature as the name and the signature; and
    inserting a corresponding request for the first service into the integration application;
  when the type of the first service descriptor is an in-out parameter descriptor:
    parsing the first service descriptor to determine types of each input and output parameter for a service;
    searching the one or more service repositories to identify, based only on the types of each input and output parameter, a second service having a same pattern of input and output parameter types as the types of each input and output parameter; and
    inserting a corresponding request for the second service into the integration application;
  when the type of the first service descriptor is a contract descriptor:
    parsing the first service descriptor to determine a uniform resource locator (URL);
    requesting a contract file using the URL; and
    inserting a corresponding request for a third service described by the contract file into the integration application;
  deploying the integration application to an application server;
  adding a first entry to an application list, the first entry corresponding to the integration application;
  forwarding the first request for services to the integration application;
  receiving a response from the integration application; and
  returning the response to the first client.

2. The method of claim 1 wherein:
the first entry includes location information for the integration application; and
the location information includes one or more location elements selected from a group consisting of a URL and an end point reference.

3. The method of claim 1, further comprising updating a timestamp included in the first entry based on a time associated with the forwarding of the first request for services to the integration application.

4. The method of claim 1 wherein adding the first entry to the application list comprises:
hashing the first custom services header; and
associating the hashed first custom services header with the first entry.

5. The method of claim 4 wherein adding the first entry to the application list further comprises removing excess whitespace characters from the first custom services header before hashing the first custom services header.

6. The method of claim 1, further comprising returning an error response to the first client when one of the searches of the one or more service repositories is not able to identify a matching service.

7. The method of claim 1, further comprising:
returning an error response to the first client when one of the searches of the one or more service repositories finds more than one matching service;
wherein the error response comprises a list of each of the more than one matching services.

8. The method of claim 1, further comprising periodically purging one or more other integration applications from the application server based on timestamps recorded in the application list.

9. The method of claim 1 wherein the first request for services is a request made using a protocol selected from a group consisting of HTTP, HTTPS, SFinal OAP, and JMS.

10. The method of claim 1, further comprising:
receiving a second request for services from a second client, the second request for services comprising a second custom services header;
determining whether the application list includes a second entry associated with the second custom services header, the second entry corresponding to a previously assembled integration application; and
forwarding the second request for services to the previously assembled integration application when the second entry corresponds to the second custom services header.

11. An integration system comprising:
a gateway;
an application list;
an integration assembler; and
a router;
wherein the gateway:
receives a first request for services from a first client;
parses the first request to determine whether the first request includes a first custom services header including a plurality of service descriptors; and
forwards the first custom services header to the integration assembler based on whether the first request includes the first custom services header;
wherein the integration assembler:
receives the first custom services header from the gateway;
creates an integration application in response to receiving the first custom services header from the gateway;
parses the first custom services header to identify each of the service descriptors;
determines a type of each of the service descriptors, each type being a name descriptor, an in-out parameter descriptor, or a contract descriptor;
when the type of a first one of the service descriptors is a name descriptor:
parses the first service descriptor to determine a name of a service and a signature of the service;
searches one or more service repositories to identify a first service having a same name and signature as the name and the signature; and
inserts a corresponding request for the first service into the integration application;
when the type of the first service descriptor is an in-out parameter descriptor:
parses the first service descriptor to determine types of each input and output parameter for a service;
searches the one or more service repositories to identify, based only on the types of each input and output parameter, a second service having a same pattern of input and output parameter types as the types of each input and output parameter; and
inserts a corresponding request for the second service into the integration application;
when the type of the first service descriptor is a contract descriptor:
parses the first service descriptor to determine a uniform resource locator (URL);
requests a contract file using the URL; and
inserts a corresponding request for a third service described by the contract file into the integration application;
deploys the integration application to an application server;
adds a first entry to the application list, the first entry corresponding to the integration application;
forwards the first request for services to the integration application using the router;
receives a response from the integration application; and
returns the response to the first client.

12. The integration system of claim 11 wherein:
the first entry includes location information for the integration application and a timestamp;
the location information includes one or more location elements selected from a group consisting of a URL and an end point reference; and
the integration assembler updates the timestamp based on a time associated with the forwarding of the first request for services to the integration application.

13. The integration system of claim 11, further comprising an application purger, the application purger deleting one or more other integration applications from the application server based on timestamps recorded in the application list.

14. The integration system of claim 11, wherein:
the integration assembler returns an error response to the first client when one of the searches of the one or more service repositories finds more than one matching service; and
the error response comprises a list of each of the more than one matching services.

15. The integration system of claim 11, wherein the gateway:
receives a second request for services from a second client, the second request for services comprising a second custom services header;

determines whether the application list includes a second entry being associated with the second custom services header; and forwards the second request for services to a previously assembled integration application corresponding to the second entry when the second entry is associated with the second custom services header.

16. The integration system of claim 11 wherein the integration system is hosted on a same server as the application server.

17. A non-transitory machine-readable medium comprising a first plurality of machine-readable instructions which when executed by one or more processors associated with an integration server are adapted to cause the one or more processors to perform a method comprising:

receiving a first request from a first client;

parsing the first request to determine whether the first request includes a first field including a first description of a first service;

creating a first custom service in response to receiving the first request;

parsing the first field to extract the first description;

determining a type of the first description, the type being a name description, an in-out parameter description, or a contract description;

when the type of the first description is a name description:

parsing the first description to determine a name of a service and a signature of the service;

searching one or more service repositories to identify a first service having a same name and signature as the name and the signature; and inserting a corresponding request for the first service into the first custom service;

when the type of the first description is an in-out parameter description:

parsing the first description to determine types of each input and output parameter for a service;

searching the one or more service repositories to identify, based only on the types of each input and output parameter, a second service having a same pattern of input and output parameter types as the types of each input and output parameter; and inserting a corresponding request for the second service into the first custom service when the type of the first description is a contract description:

parsing the first description to determine a uniform resource locator (URL);

requesting a contract file using the URL; and inserting a corresponding request for a third service described by the contract file into the first custom service;

sending the first custom service to a host server;

adding a first record to a custom services registry, the first record being associated with the first field and corresponding to the first custom service;

sending the first request to the first custom service, the first request causing execution of the first service;

receiving a first response from the first custom service;

returning the first response to the first client;

receiving a second request from a second client, the second request comprising a second field including a second description of a second service;

determining whether the custom services registry includes a second record associated with the second field;

sending the second request to a second custom service corresponding to the second record when the second record is associated with the second field;

sending the second request to the second custom service;

receiving a second response from the second custom service; and returning the second response to the second client.

18. The non-transitory machine-readable medium of claim 17, further comprising a second plurality of machine-readable instructions which when executed by the one or more processors are adapted to cause the one or more processors to perform a method comprising periodically deleting one or more other custom services from the host server based on time information recorded in the custom services registry.

* * * * *